United States Patent [19]

O'Neal

[11] 4,070,801
[45] Jan. 31, 1978

[54] FLEXIBLE DOCK SEAL

[76] Inventor: Larry O'Neal, 4953 Timbercrest Drive, Canfield, Ohio 44406

[21] Appl. No.: 729,277

[22] Filed: Oct. 4, 1976

[51] Int. Cl.² .................. E04B 1/34; E04B 7/14
[52] U.S. Cl. .................................... 52/2; 52/83; 52/173 DS
[58] Field of Search .............. 52/2, 173, 63, 222, 52/83; 49/15, 52, 408; 212/145

[56] References Cited

U.S. PATENT DOCUMENTS

| | | | |
|---|---|---|---|
| 2,704,574 | 3/1955 | Etlar | 52/173 |
| 2,939,467 | 6/1960 | Meyer et al. | 52/2 |
| 3,256,440 | 6/1966 | Stark | 52/2 X |
| 3,303,615 | 2/1967 | O'Neal | 52/2 |
| 3,391,502 | 7/1968 | O'Neal | 52/2 |
| 3,391,503 | 7/1968 | O'Neal | 52/2 |
| 3,402,960 | 9/1968 | Erke | 52/2 X |
| 3,714,745 | 2/1973 | O'Neal | 52/2 |

Primary Examiner—Price C. Faw, Jr.
Assistant Examiner—Robert C. Farber
Attorney, Agent, or Firm—Webster B. Harpman

[57] ABSTRACT

A flexible dock seal for closing an opening such as a loading dock with respect to a truck or trailer takes the form of an inverted U-shaped flexible structure normally positioned in extended relation to the loading dock opening by resilient devices and yieldable upon engagement therewith by the truck or trailer so as to form a satisfactory closure between the dock and the truck or trailer.

5 Claims, 5 Drawing Figures

U.S. Patent   Jan. 31, 1978   4,070,801
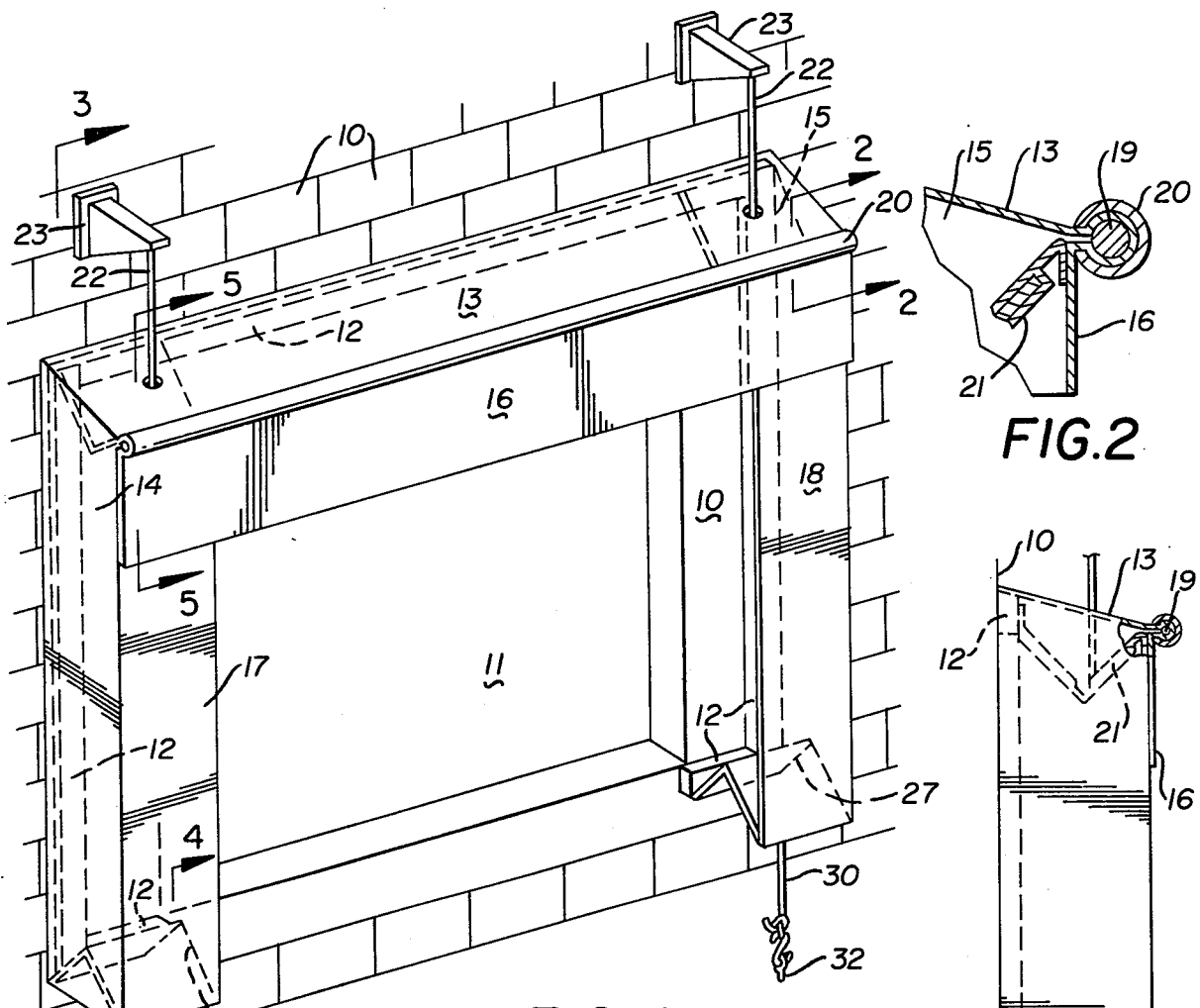
FIG. 1
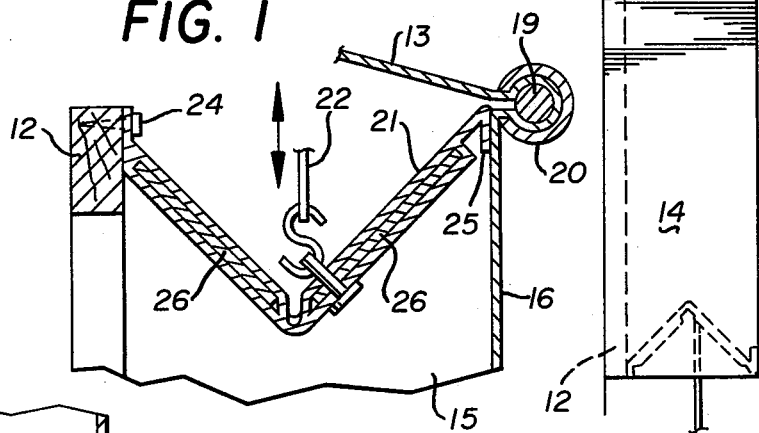
FIG. 2
FIG. 5
FIG. 3
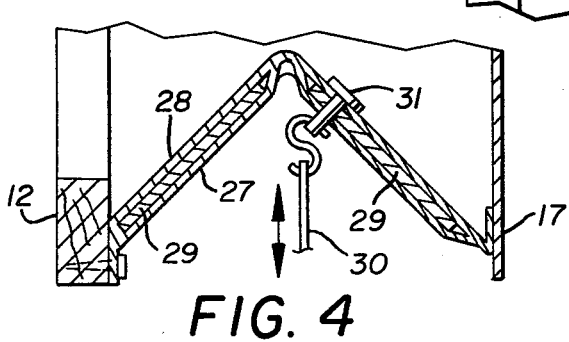
FIG. 4

FLEXIBLE DOCK SEAL

BACKGROUND OF THE INVENTION

1. Field of the Invention

This invention relates to dock seals for closing and opening in a building with respect to a truck or a trailer positioned adjacent thereto.

2. Description of the Prior Art

Prior structures of this type have generally comprised inflated members against which the truck or trailer is engaged. See for example my earlier U.S. Pat. No. 3,714,745 and also U.S. Pat. Nos. 2,634,589, 2,939,467, 3,303,615, 3,391,502 and 3,391,503.

This invention discloses a flexible dock seal structure capable of forming a satisfactory yieldable closure between a truck or a trailer and the loading dock opening without the use of the inflatable members heretofore believed necessary.

SUMMARY OF THE INVENTION

A flexible dock seal comprises three yieldable flexible members arranged in an inverted U-shape about the loading dock opening and having foldable hinge-like devices in their upper and lower corners arranged to extend the three sections of the flexible dock seal outwardly with respect to the loading dock opening. Resilient members normally urge the foldable hinge-like devices into opened extended relation and yieldingly permit the same to be moved toward a closed folded relation. The longitudinal edges of the yieldable flexible members are secured to the structure in which the loading dock opening is formed so as to create a weathertight closure.

DESCRIPTION OF THE DRAWINGS

FIG. 1 is a perspective elevation of a portion of a building wall with a loading dock opening and showing the flexible dock seal positioned thereabout.

FIG. 2 is an enlarged detail on line 2—2 of FIG. 1;

FIG. 3 is a side elevation on line 3—3 of FIG. 1;

FIG. 4 is an enlarged detail on line 4—4 of FIG. 1; and

FIG. 5 is an enlarged detail on line 5—5 of FIG. 1.

DESCRIPTION OF THE PREFERRED EMBODIMENT

In the form chosen for illustration herein, the flexible dock seal comprises three yieldable members arranged in an inverted U-shape and positioned on the exterior of a building above and to the sides of an opening therein against which a truck or a trailer is to be positioned.

In FIGS. 1 and 2 the building wall is generally indicated by the numeral 10 and the dock opening therein is indicated by the numeral 11. An inverted U-shaped frame 12 is formed as by way of example from 2 × 4s is mounted on the wall 10 at the sides of and across the top of the opening 11 therein. Three elongated flexible panels 13, 14 and 15 are attached at one of their longitudinal edges to the frame 12 and it will be seen that the panel 13 is substantially horizontally positioned across the top of the opening 11 and the panels 14 and 15 are positioned vertically at the sides of the opening 11 and each of them extend forwardly or outwardly with respect to the building wall 10. Each of the panels 13, 14 and 15 has a right angular flange on its outer edge, the flange on the flexible panel 13 being in depending relation thereto and indicated by the numeral 16 and the flanges on the panels 14 and 15 are arranged to extend toward one another and are indicated at 17 and 18 respectively. The panels 13, 14 and 15 and their flanges 16, 17 and 18 are formed of flexible material such as waterproofed canvas or the like. The upper ends of the flexible panels 14 and 15 are joined to the ends of the flexible panel 13 and the right angular flanges 17 and 18 are attached to the depending flange 16.

By referring now to FIG. 1, 2 and 3 of the drawings, it will be seen that the outermost edge of the elongated flexible panel 13 where it joins the upper edge of the depending flange 16 is wrapped around a rope 19 and positioned in a split tube 20 to form a substantially rigid frame member. In order that the frame member 20 and the forward edge of the elongated flexible panel 13 and the upper ends of the flanges 17 and 18 on the flexible panels 13 and 15 will be held in the position illustrated, a pair of hinge-like devices 21, one of which is illustrated in FIG. 5 of the drawings, are positioned between the upper portion of the frame 12 and the split tube 20 adjacent its opposite ends. Each of the hinge-like devices 21 is normally held in substantially extended or open position by resilient members 22 attached thereto by fasteners 23 and extending upwardly through openings in the elongated flexible panel 13 and secured at their uppermost ends to support arms 23 which in turn are carried on the building wall 10.

By referring again to FIG. 5 of the drawings, it will be seen that one end of the hinge-like device 21 is secured at its outermost edge to the frame 12 by one or more fasteners 24 and that its opposite outer end is flanged as at 25 and secured as by sewing to the depending flange 16 of the elongated flexible panel 13. The hinge-like device 21 preferably comprises sections of flexible material such as waterproof canvas sewed together to form flat pockets in which rigid members 26 are positioned. Alternately the hinge-like devices 21 may comprise oppositely disposed T-shaped members hinged together at their inner ends and having their T-head portions movably affixed to the frame 12 and the flange 16 respectively and provided with resilient means normally urging the hinged T-shaped members into open or extended relation to one another.

By referring again to FIG. 1 of the drawings it will be seen that the lower ends of the panels 14 and 15 and their oppositely disposed flanges 17 and 18 are also held in yieldably extended relation to the building wall 10 by means of foldable hinge-like devices 27 which are also illustrated in cross section and in enlarged detail in FIG. 4 of the drawings.

By referring to FIGS. 1 and 4 of the drawings, it will be seen that the foldable hinge-like devices 27 are similar to the devices 21 heretofore described in that they comprise sections of flexible material 28 sewed or otherwise arranged to form flat pockets in which sections of rigid material 29 are disposed. The outer ends of the hinge-like devices 27 are flanged and fastened respectively to horizontal portions of the frame 12 as best seen in FIG. 1 of the drawings and to the lower ends of the flexible flanges 17 and 18. Each of the foldable hinge-like devices 27 is held in open or extended relation as illustrated in FIG. 1 of the drawings by resilient members 30 which are attached thereto by means of fasteners 31. The opposite or lower ends of the resilient members 30 are attached to hooks 32 which may be positioned in the ground or the driveway or alternately in the wall 10 of the building at a distance below the lower ends of the flexible dock seal.

It will thus be seen that a flexible dock seal has been disclosed which will retain itself in extended relation by reason of the resilient urging of the membes 22 and 30 respectively holding the structure of the flexible dock seal outwardly with respect to the wall 10 of the building and around the opening 11 comprising the loading dock.

When a truck or a trailer is backed against the same the foldable hinge like devices 21 and 27 will move toward closed position as the flexible dock seal engages the truck or trailer body and thereby form a suitable weather closure between the building wall 10 and the truck or trailer body.

It will be obvious that the device of the invention can be formed inexpensively as compared with the inflatable dock seals or those involving sponge rubber cushions heretofore known in the art and installed quickly and easily at relatively low expense on the walls of buildings surrounding loading dock openings therein and in such position will operate without the use of electricity as has heretofore been necessary to operate the blowers of the inflatable devices.

Although but one embodiment of the present invention has been illlustrated and described, it will be apparent to those skilled in the art that various changes and modifications may be made therein without departing from the spirit of the invention.

Having thus described my invention what I claim is:

1. A flexible dock seal for positioning on a wall about an opening therein and comprising a flexible inverted U-shaped device consisting of a horizontal upper flexible member and a pair of vertical flexible members positioned one at each end thereof in depending relation thereto, means above said opening positioning said upper flexible member transversely there across in planes generally outwardly and downwardly from the plane of the wall and means at the sides of said opening positioning said vertical flexible members in planes generally outwardly and parallel with the plane of the wall and foldable hinge-like devices positioned between said wall and said flexible members and resilient means attached thereto for normally holding the foldable hinge-like devices in a first position extending outwardly from said wall and movable to a second position adjacent said wall.

2. The flexible dock seal set forth in claim 1 and wherein said upper horizontal flexible member comprises a first portion extending outwardly from said wall and a second portion depending from the outer edge thereof and wherein said pair of vertical flexible members comprise first portions extending outwardly from said wall and second portions theron extending toward one another.

3. The flexible dock seal set forth in claim 1 and wherein said means above said opening and said means at the sides of said opening comprise members attached to said building wall and to the longitudinal edges of said flexible members.

4. The flexible dock seal set forth in claim 1 and wherein the foldable hinge-like devices comprise superimposed sections of flexible material defining flat pockets therebetween, sections of rigid material positioned in said flat pockets, said sections of flexible material being secured to one another and arranged to form said hinge-like structures.

5. The flexible dock seal set forth in claim 1 and wherein said resilient means comprises resilient cords attached to said foldable hinge-like devices midway between their ends and to fixed locations on said wall adjacent said dock seal and normally urging said foldable hinge-like devices to open and extended position.

* * * * *